United States Patent [19]

Bohm et al.

[11] B 3,998,715

[45] Dec. 21, 1976

[54] RADIATION CROSSLINKED POLYVINYL CHLORIDE AND PROCESS THEREFOR

[75] Inventors: Georg G. A. Bohm, Akron, Ohio; Dale S. Pearson, Hauppauge; James O. Tveekrem, E. Patchogue, both of N.Y.

[73] Assignee: The Firestone Tire & Rubber Co., Akron, Ohio

[22] Filed: June 6, 1974

[21] Appl. No.: 476,776

[44] Published under the second Trial Voluntary Protest Program on March 23, 1976 as document No. B 476,776.

[52] U.S. Cl. .................. 204/159.16; 204/159.17; 260/23 XA; 260/42.34; 260/42.37; 260/42.49; 260/42.52; 260/42.53; 260/45.7 S; 260/45.75 R; 260/45.75 K; 260/45.85 E; 260/878 R; 260/884

[51] Int. Cl.² .................. C08F 8/00; C08L 91/00; C08L 27/22

[58] Field of Search .................. 260/884, 878 R; 204/159.17, 159.16

[56] References Cited

UNITED STATES PATENTS

| | | | |
|---|---|---|---|
| 3,539,488 | 11/1970 | Klopfer et al. | 204/159.17 |
| 3,542,661 | 11/1970 | Klopfer et al. | 204/159.17 |
| 3,785,849 | 1/1974 | Parker et al. | 204/159.22 |
| 3,816,559 | 6/1974 | Farone | 260/884 |
| 3,816,564 | 6/1974 | Holliday et al. | 260/884 |

Primary Examiner—John C. Bleutge
Assistant Examiner—Thurman K. Page
Attorney, Agent, or Firm—Cooper, Dunham, Clark, Griffin & Moran

[57] ABSTRACT

Radiation crosslinked polyvinyl chloride compositions employing ethoxylated bis phenol-A dimethacrylate and similar compounds as crosslinking monomers.

12 Claims, No Drawings

RADIATION CROSSLINKED POLYVINYL CHLORIDE AND PROCESS THEREFOR

BACKGROUND OF INVENTION

This invention relates to polyvinyl chloride compositions. More particularly, it relates to cross-linkable or curable compositions in which the cross-link promoters are unsaturated derivatives of acrylic or methacrylic acid which have not been previously employed for this purpose. The invention is particularly applicable to the preparation of wire coatings, and flexible and rigid forms such as pipes and rods which may be formed by extrusion or light machine parts and housings which are normally molded.

Polyvinyl chloride is a well characterized and widely employed polymer. It has been used in a large variety of commercial applications, and continues to be so utilized. It has, for example, been molded to form coverings and housings for numerous articles, including telephones, vacuum cleaners, electrical motors and the like. It has been used in wire coatings, and as a substitute for metallic pipe in those instances where it will not be exposed to prolonged or excessive heat.

The properties of polyvinyl chloride can be improved by curing. Such improved properties include better tensile strength, higher modulus at elevated temperatures, higher resistance to creep, flow and distortion at elevated temperatures and better abrasion resistance. More specifically, when polyvinyl chloride is employed as a wire coating, curing improves hot cut through resistance, imparts better resistance to damage caused by contact with hot solder or with the solder iron, and permits the use of relatively thinner coatings because of improved abrasion resistance and strength. With pipes, the improvements include better burst strength at elevated temperature, better resistance to expansion and distortion under load, and better solvent and chemical resistance.

Curing is effected by the formation of cross-links between adjacent polymer molecules. Cross-linking is normally induced by the presence of a free radical generator such as an azo compound or a peroxide.

Attempts have been made to induce cross-linking utilizing high energy radiation. It was found, however, that polyvinyl chloride degrades at a faster rate than it cross-links when subjected to radiation energy at a sufficiently high level to induce cross-linking. To avoid this difficulty, the art has relied more and more on so-called cross-link promoters, both direct and indirect. Direct cross-link promoters are unsaturated compounds such as triallyl cyanurate, triallyl isocyanurate, trimethylolpropane trimethacrylate, ethylene glycol dimethacrylate, tetraethylene glycol dimethacrylate and diallyl phthalate which under the influence of radiation energy directly enter into the structure of the final molecule. Indirect promoters normally are halogenated compounds such as carbon tetrachloride which do not appear to become a segment of the final cross-linked molecules. In any event, the function of the promoters is to permit the curing of polyvinyl chloride compositions at a sufficiently low total radiation dose so that the polyvinyl chloride cures faster than it degrades.

The presently known cross-linking agents are not completely satisfactory for a number of reasons. For example, those cross-linkers which include an allyl group such as triallyl cyanurate, while an improvement, still require undesirably high energy levels for the cross-linking reaction. Often there is a loss of impact resistance in the final product.

The products produced by radiation cross-linking often manifest undesirably low thermal and heat aging stability. This has been attributed to electron irradiation damage during cross-linking due to high energy levels required even when cross-link promoters are employed. The art has attempted to overcome this problem by the addition of energy absorbers to protect the polyvinyl chloride from radiation damage. Unfortunately, the use of energy absorbers has been found to decrease the rate of cross-linking. This is a serious problem in modern mass production.

Novel polyvinyl chloride curable compositions which substantially alleviate the problems of the prior art and include a class of cross-link promoters not previously described for such use have now been discovered. The curing of these compositions makes possible the production of new products such as insulating wire coatings, pipe and other moldings which are characterized by improved properties, particularly thermal stability, heat aging stability, impact strnegth and resistance to water absorbtion at high temperatures.

The term "polyvinyl chloride" as used in the description of this invention refers to homopolymers and copolymers prepared from vinyl chloride alone or together with other comonomers, particularly α-olefins such as ethylene and propylene, vinyl ethers and vinyl esters, especially ethers containing up to six carbon atoms, such as methyl, ethyl, propyl and butyl ethers and vinyl acetate, vinyl propionate and vinyl butyrate, as well as acrylic and methacrylic acid derivatives, especially esters such as methyl or ethyl acrylate or the corresponding methacrylates.

THE INVENTION

The novel curable compositions of this invention will contain at least one curing agent represented by the formula:

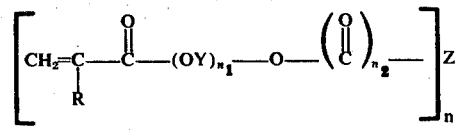

wherein:
R is hydrogen or methyl
$n$ is 1 to 4
$n_1$ is 0 or 1
$n_2$ is 0 or 1
Y is a bifunctional, aliphatic organic radical which may be linear or branched and may be substituted with an acrylic or methacrylic radical or with a radiation stable group, and
Z is an alicyclic, group an aryl group or an aralkyl group which contains up to two carbon atoms in an exocyclic chain said groups containing up to two rings which may be fused, joined directly through a carbon atom on each ring or bridged together through a carbon or oxygen atom; with the proviso that $n_1$ and $n_2$ are not both zero in the same compound if $n_2$ is one, $n_1$ is one and if $n$ is one Y must contain an acrylic or methacrylic function.

It will be noted that this general formula excludes compounds such as phenyl and naphthyl benzoate as well as compounds which do not contain at least two acrylyl or methacryl groups. It includes compounds such as those represented by the formulas given below from which it will be observed that it is not necessary for the substituents to be symmetrical, although it is preferred for ease of production that they be symmetrical.
1. 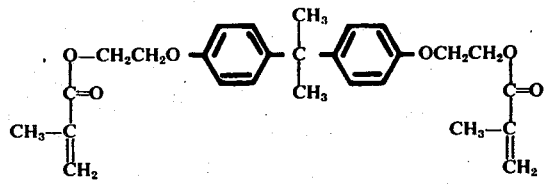
2. 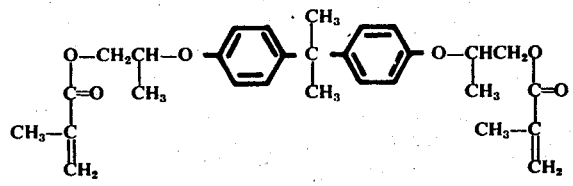
3. 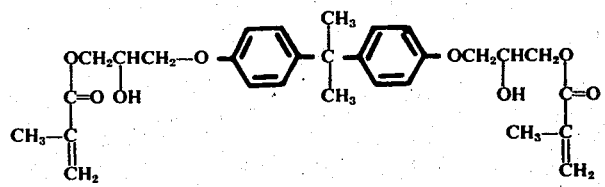
4. 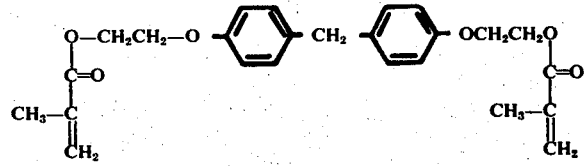
5. 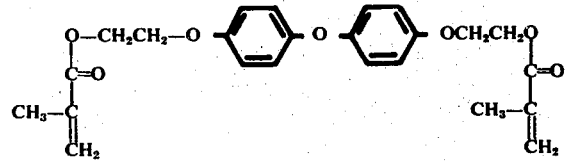
6. 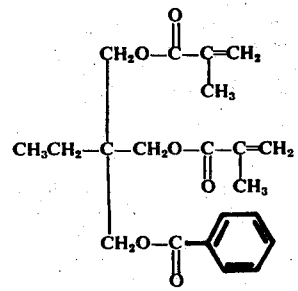
7. 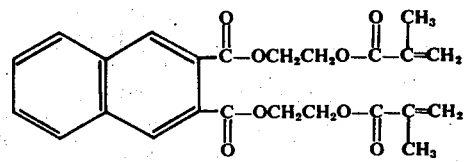
8. 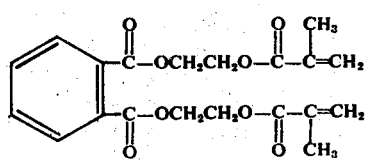

9. 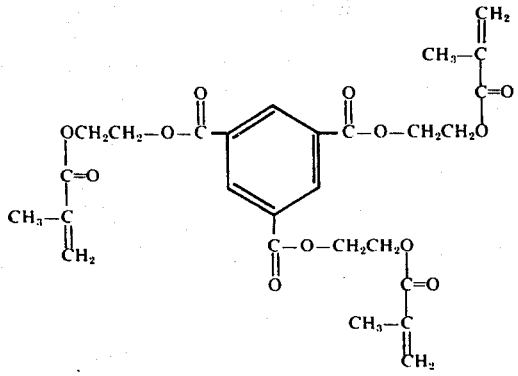

10. 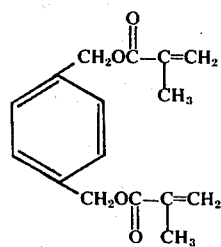

11. 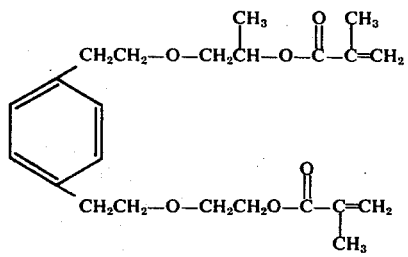

12. 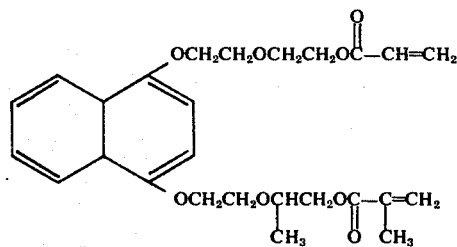

The preferred compounds within the scope of the invention are represented by the formula:

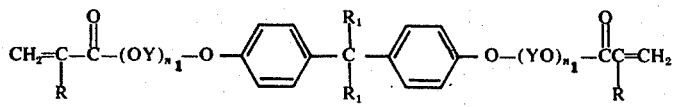

wherein:
Y is ethylene or trimethylene
$n_1$ is 1
$R_1$ is H or —$CH_3$
R is H or —$CH_3$ Compounds 1 through 5 above as well as the corresponding acrylic compounds are representative of the preferred compounds of the invention. They are preferred because they appear to balance the correct proportion of aromaticity with overall chain length within the same molecule to achieve the desired improvements in polyvinyl chloride properties, because they are readily available at a cost which bears a reasonable relationship to the improved properties which can be obtained, and because they blend well with most polyvinyl chloride compositions.

The vulcanizable, or curable compositions of this invention comprise uncured polyvinyl chloride having an average molecular weight of from about 50,000 to 150,000 containing, based on the total weight, from about 2% to 50% of one or more curing agents of the formula set forth above. It has been found that for wire coatings the optimum weight percent is from about 5% to 15%, and for pipes the optimum values are from about 25% to 30%.

It is sometimes advantageous, although not essential to the practice of this invention, to include other cross-linking monomers such as those specifically mentioned above in the curable compositions of the invention. One of the advantages which may be obtained by the use of the more common monomers is reduced cost. Another is that the cross-link density of the vulcanized products of the invention is increased, thus improving their heat distortion characteristics. If additional cross-linking monomers are employed, it is preferred to utilize trimethylolpropane trimethacrylate, tetraethylene glycol dimethacrylate, butylene glycol dimethacrylate, or the corresponding acrylates. Normally, the percent by weight of such additional monomers in the vulcanizable compositions of the invention will be from about 5% to 25%.

It will be understood that the vulcanizable compositions of this invention may contain other ingredients of the type normally employed with polyvinyl chloride. These may include, for example, antioxidants, pigments and the like. Additionally, they may contain stabilizing agents, particularly lead stabilizing agents such as basic lead silicate or sulfate, lead salts of organic carboxylic acids such as tribasic lead maleate monohydrate, dibasic lead phthlate, dibasic lead stearate or normal lead stearate and others containing from 4 to 18 carbon atoms. Commercially available lead stabilizers include Tribase E, Dyphos, Tribase XL or Dythal XL.

Other conventional stabilizers which may be included in the compositions include dialkyl tin esters and thiolesters, as well as various mixtures of barium, cadmium, calcium and zinc organic acid esters.

Fillers such as calcined clay, calcium carbonate, which may be coated with stearic acid, titanium dioxide, silica and the like may also be employed.

The compositions may include lubricants such as waxes, polyethylene, or acrylic copolymers of the normal class employed for such use.

Antioxidants which may be employed include aklylated phenols, phosphites and sulfur containing chemicals such as dilauryl thiodipropionate.

The compositions may also include plasticizers of the type commonly utilized with polyvinyl chloride. Typically, these will include alkyl esters of adipic, sebacic, phthalic or trimellitic acids, epoxidized products such as epoxidized soy bean oil, and polyesters prepared by esterification of polybasic acids with polyhydroxy alcohols, — suitably adipic acid with ethylene glycol.

All of the above described additives, when utilized in the compositions of this invention, are employed in the same quantities as in conventional polyvinyl chloride compositions.

The desired curing or vulcanization can be accomplished in accordance with this invention by subjecting the selected composition to an adequate dose of high energy particle irradiation. The technique serves to effect cross-linking and thereby achieve the desired objectives of the invention. The radiation can be carried out by passing the composition, suitably in the form of a thin layer of from about 0.005 to 0.25 inches in thickness through a beam of high energy electrons under conditions that will give a high energy dose range of from 0.1 to 10 Mrads. Such a dose range is sufficient to effect any desired degree of curing to produce a wide variety of useful products. In general, doses of from 1 to 5 Mrads are preferred. Typically, the dose rate is from about 0.01 to 100 Mrad/min., although appreciable variation is possible. The preferred dose rate is from 0.1 to 50 Mrad/min. Thicker layers of the composition, for example up to about 0.5 inch in thickness, can be treated by two passes through the beam, first on one side and then on the other.

Various dose rates can be achieved from conventional radiation equipment by techniques known in the art. For example, the desired amount of radiation can be obtained using a 300 Kev electron accelerator which emits a circular beam of electrons from a heated cathode filament. The electrons are guided through a scanning magnet and emerge through a thin titanium window which is approximately 1 by 24 inches. A beam power of 3 Kw is obtained at an operating current of 10 mamps. The dose delivered can be measured using the well-known blue cellophane technique. See Henley and Richman; Anal. Chem. 28, 1580 (1956). By altering the beam current, beam diameter and distance to the source, various dose rates can be obtained.

The cured products of this invention which comprise polyvinyl chloride cross-linked with one or more cross-linking agents of the class, the formula of which is given above, and may additionally contain other cross-linking monomers as well as additives of the types discussed hereinabove, have a number of important advantages compared to ordinary radiation cured polyvinyl chloride products. For example, products of this invention have a remarkably high degree of color, aging and thermal stability.

As is known, when polyvinyl chloride compositions are irradiated, they begin to discolor almost immediately, eventually becoming a deep brown or black. The compositions of this invention, as is illustrated in the examples, are extremely resistant to such discoloration.

One of the primary disadvantages of irradiated polyvinyl chloride is that radiation accelerates the degradation of the irradiated products, with the result that they quickly become inflexible and brittle. It has been established by accelerated aging tests, which were based upon determination of tensile strength, elongation at the break and weight loss, that the products of this invention are not subject to such degradation. Another common disadvantage associated with radiation cross-linked polyvinyl chloride products is their tendency to degrade with evolution of hydrogen chloride when exposed to elevated temperatures. This is a particular problem with wire coating compositions since the corrosive nature of hydrogen chloride interferes with the electrical properties of any material which is exposed to it. The products of this invention, as illustrated in the examples, have a remarkably reduced tendency to evolve hydrogen chloride.

One of the problems with ordinary polyvinyl chloride compositions intended for extrusion followed by curing under radiation is that the monomers, under the influence of high extrusion temperatures, tend to chemically react prematurely so as to effect undesirable cross-linking during the extrusion operation. The vulcanizable compositions of this invention are particularly resistant to such premature cross-linking during extrusion.

The cured products of the invention such as pipe, wire insulation, molded parts and the like are remarkably improved with respect to resistance to water absorption when compared with ordinary PVC products prepared by radiation cross-linking using prior art monomers as the cross-linking agents. This is attributed to the hydrophobic nature of the cross-linking agents utilized in this invention compared with the hydrophilic nature of prior art monomers, many of which are prepared from aliphatic glycols.

One of the more serious problems with the commercial utilization of radiation as a procedure for curing polyvinyl chloride compositions is the determination of the necessary balance between those properties which are improved by cross-linking and those which are not. For example, to obtain an improved heat distortion characteristic, modulus of elasticity and creep resistance, it is necessary to use relatively large amounts of cross-linking monomer, — which could be as high as 10% to 50% by weight. The problem is that the use of a relatively high concentration of cross-linking agents results in products which are brittle, fragile and exhibit low impact strength.

With the cross-linking agents utilized in this invention, it is often possible to utilize relatively high quantities of a monomer so as to attain the desirable characteristics of the final products, without at the same time achieving undesirable characteristics. The cured products of this invention manifest high impact strength without becoming brittle.

The following nonlimiting examples are given by way of illustration only:

EXAMPLE I

Samples of PVC-cross-linking monomer blends were prepared by slurrying a mixture of the monomer with PVC powder in methanol and evaporating the stirred slurry to assure a uniform distribution of the cross-linking monomer. Films were hot pressed from these PVC-monomer blends to about a 2 to 4 mil thickness. Examples for which dehydrochlorination data are reported were prepared from Firestone FPC 9269A polyvinyl chloride resin and 30 parts on one hundred of resin of ethoxylated bisphenol A dimethacrylate (EBPADMA) or trimethylolpropane trimethacrylate (TMPTMA) followed by electron irradiation cross-link curing at a 6 Mrad dose using 1.4 MeV electrons.

Dehydrochlorination runs were made on samples of films weighing about 0.20 grams. They were maintained at a temperature of 180°C in a 125 ml conical flask. A constant gas sweep over the surface of the sample at the rate of 30 ml per minute was maintained within less than ½ ml/min. The exit gas was passed through 450 ml of absorbent water containing 1% potassium chloride. Vigorous stirring and a gas bubbling system assured complete absorption of the hydrogen chloride. Aliquots of 0.01 N. sodium hydroxide were added to the absorbent and the time required to bring the absorbent to neutrality on a pH meter was recorded. The recording of aliquots of base and time to neutralization gave the amount of hydrogen chloride evolved and the time of evolution. The entire operation was performed with only the sweep gas in contact with the absorbent to preclude the effect of carbon dioxide in the air on the neutralization point.

TABLE I

DEHYDROCHLORINATION BEHAVIOR OF ELECTRON IRRADIATED PVC AND PVC-CROSS-LINKING MONOMER BLENDS

| Sample | Micromoles of Hydrogen Chloride Evolved per Gram of Sample | | | |
|---|---|---|---|---|
| | 30 | 50 | 100 | 500 |
| | Minutes to Evolve Hydrogen Chloride | | | |
| PVC (9269A) | 7.4 | 9.2 | 14.2 | 80 |
| PVC (9269A)-TMPTMA | 7.5 | 9.5 | 15.0 | 70 |
| PVC (9269A)-EBPADMA | 13.0 | 18.1 | 33.0 | 152 |

Dehydrochlorination conditions: 180°C, $CO_2$ free air gas sweep at 30 ml/min.

TABLE II

DEHYDROCHLORINATION BEHAVIOR OF ELECTRON IRRADIATED PVC AND PVC-CROSS-LINKING MONOMER BLENDS

| Sample | Micromoles of Hydrogen Chloride Evolved per Gram of Sample | | | |
|---|---|---|---|---|
| | 30 | 50 | 100 | 500 |
| | Dehydrochlorination Rate in Micromoles/Gram of Sample Minute | | | |
| PVC (9269A) | 10 | 12.5 | 9.0 | 5.7 |
| PVC (9269A)-TMPTMA | 8 | 9.9 | 11.5 | 7.2 |
| PVC (9269A)-EBPADMA | 3.1 | 4.4 | 3.9 | 3.5 |

Dehydrochlorination conditions: 180°C, $CO_2$ free air gas sweep at 30 ml/min.

Tables I and II show the dehydrochlorination behavior of irradiated samples of FPC 9269A PVC and blends of TMPTMA and EBPADMA with FPC 9269A. The dehydrochlorination data is shown in Table I as moles of evolved hydrogen chloride against time in minutes for runs in $CO_2$ free air and in Table II, as the rate of dehydrochlorination in moles of hydrogen chloride per gram of sample per minute against the evolved moles per gram of samples. Tables I and II show the obviously superior properties as regards dehydrochlorination for EBPADMA. Table II shows the lower rates of dehydrochlorination in air for the EBPADMA compound. In addition, it is noteworthy that the initial high rate observed for dehydrochlorination of irradiated PVC samples is considerably suppressed by the presence of the EBPADMA. It appears that this monomer offers considerable irradiation damage protection for the irradiation cross-linked PVC compounds.

EXAMPLE II

The advantage of EBPADMA as a cross-linking monomer with the ability to stabilize PVC can be shown in the following example:

Two formulations of PVC containing ingredients necessary for a wire insulation formulation were prepared. The only difference between these was that formulation B contained TMPTMA whereas formulation A contained EBPADMA. The materials were blended in powder form and then fused on a heated two-roll mill. The resulting sheet was pressed in a compression mold 6 inch × 6 inch at 350°F. This plaque was irradiated to 6 Mrads and then aged for four days in a forced draft oven at 158°C. The measured physical properties were as follows:

|  | A | B |
|---|---|---|
| Tensile (original) | 3300 | 3245 |
| % Retention after Aging | 103 | 105 |
| Elongation (original) | 182 | 182 |
| % Retention after Aging | 88 | 69 |

The greater percent retention of elongation indicates that formulation A is more resistant to embrittlement during aging.

|  | Formulation A (Parts) | Formulation B (Parts) |
|---|---|---|
| PVC - FPC 9269A | 100 | 100 |
| Santicizer 712 | 40 | 40 |
| TMPTMA |  | 15 |
| EBPADMA | 15 |  |
| XPL-125 | 15 | 15 |
| DS-207 | 2 | 2 |
| Wax OP | .15 | .15 |
| Wax S | .50 | .50 |
| Irganox 1010 | .50 | .50 |

EXAMPLE III

EBPADMA improves the color stability of irradiated PVC. This can be demonstrated by conducting an oven heat stability test (ASTM D2115) and then measuring the change in color using an optical densitometer. (Welch Model 400, 5000 A interference filter.) A PVC formulation was prepared containing the following parts by weight:

| FPC 9269A | 100 |
| Mark 649C | 3 |
| Wax 160 | .5 |
| Irganox 1010 | 1 |
| Monomer | 30 |

The monomer was either TMPTMA or EBPADMA. The formulations were mixed on a two roll mill operating at 350°F and then molded in a heated press. The resulting films were about 0.025 inch thick. The films were irradiated to 6 Mrads and then placed in an oven at 177°C (350°F). At various intervals, the films were removed from the oven and checked for optical density at 5000 A. Data from this test show that samples containing EBPADMA have a much greater resistance to discoloration.

| | Time to Reach a Defined Optical Density at 177°C, Minutes | |
|---|---|---|
| Monomer | Optical Density & 1.0 | Optical Density & 2.0 |
| TMPTMA | 2.5 | 5 |
| EBPADMA | 89 | 108 |

The above experiment was repeated using other monomers including trimethylol propane triacrylate, tetraethylene glycol dimethacrylate, ethoxylated bisphenol A triacrylate, ethoxylated bisphenol C dimethacrylate, and xylidyl glycol dimethacrylate. Products prepared from the first two monomers discolored rapidly whereas the last three monomers, which are typical of the cross-linking agents of this invention, were extremely resistant to color change.

EXAMPLE IV

An experiment similar to that in Example II was performed. The following formulations were prepared:

|  | Parts |
|---|---|
| PVC - FPC 9269A | & 100 |
| Emery 4284R | 50 |
| XPL 125 | 15 |
| Irganox 1010 | .5 |
| Stearic Acid | .1 |
| Monomer | & 8 or 22 |

The monomer was either TMPTMA or EBPADMA. The formulations were processed and irradiated as in Example II and then aged for 7 days at 158°C. The measured physical properties were as follows:

| MONOMER | EBPADMA | TMPTMA | EBPADMA | TMPTMA |
|---|---|---|---|---|
| Parts of Monomer | 8 | 8 | 22 | 22 |
| Tensile, psi (original) | 3194 | 3137 | 3622 | 3519 |
| % Retention after aging | 96.5 | 107 | 105 | 122 |
| Elongation, % (original) | 243 | 221 | 150 | 150 |
| % Retention after aging | 76.9 | 66.1 | 74.7 | 54 |

In each case, the greater percent retention of elongation after aging indicates that formulations containing EBPADMA have better aging resistance.

EXAMPLE V

Specimens of 30 parts by weight of cross-linking monomer in 100 parts by weight of FPC 9269A polyvinyl chloride were prepared either by casting from a tetrahydrofuran solution or by molding at elevated temperatures. The unsaturation in films 1–3 mils thick was measured by infrared analysis and the ratio of the absorbance of the unsaturation peak at 6.1 microns to the absorbance of the carbon-chlorine peak at 14.3 microns was obtained. This ratio after a specified heat treatment was compared to a reference ratio obtained from cast samples which had been formed under room temperature evaporation of the solvent. The extent of retention of the reference unsaturation ratio after heat treatment was utilized as a measure of thermal polymerization of the cross-linker.

The table shows the results for TMPTMA, tetraethylene glycol dimethacrylate, xylidylyl glycol dimethacrylate and EBPADMA cross-linking monomers. The aromatic cross-linking monomers are obviously superior to the aliphatic monomers in their resistance to thermal polymerization under processing conditions.

Thermal Polymerization in Specimens of 30 phr
Cross-linking Monomer in 100 phr FPC 9269A PVC

| Monomer | Heating Conditions | % Retention of $A_{c=c}/A_{c-c1}$ |
|---|---|---|
| TMPTMA | Molded - 30 sec. at 180°C | 59.9 |
| TMPTMA | Molded - 30 sec. at 140°C | 84.9 |
| TMPTMA | Cast - 17 hrs. at 80°C | 70.9 |
| TEGDMA | Molded - 30 sec. at 150°C | 80.6 |
| TEGDMA | Cast - 29 hrs. at 80°C | 82.2 |
| TEGDMA | Cast - 20 hrs. at 90°C | 75.3 |
| EBPADMA | Molded - 1 min. at 150°C | 88.6 |
| EBPADMA | Molded - 1 min. at 180°C | 87.0 |
| EBPADMA | Cast - 20 hrs. at 90°C | 99.8 |
| XGDMA | Molded - 5 min. at 180°C | 96.7 |
| XGDMA | Cast - 19 hrs. at 90°C | 100 |

EXAMPLE VI

Two compositions were prepared starting with the following ingredients:

| | Parts |
|---|---|
| PVC 9269A | & 100 |
| Mark 649C | 3 |
| Bisphenol A | .1 |
| Calcium Stearate | .5 |
| AC PE629A | .15 |
| Wax 160 | 0.5 |
| K175 | 2 |
| K120N-D | 1 |
| TiO$_2$ | 1 |
| Carbon Black | 0.5 |

Composition A was made by adding 40 parts of EBPADMA to these ingredients and Composition B was made by adding 40 parts of trimethylol propane trimethacrylate to these ingredients. Both compositions were fused on a hot two-roll mill (350°F) and then removed from the mill as a sheet suitable for molding into 6 inch × 6 inch slabs, 0.075 inch thick. These slabs were prepared and irradiated to 10 Mrads and then sectioned and placed in a water bath maintained at 180°F (82.2°C). After 75 days, Composition A had gained only 0.0031 grams of water per cm$^2$ of surface area whereas Composition B had gained 0.0058 grams of water per cm$^2$ of surface area. This represents a decrease of 47.5% in water absorption when EBPADMA is used. Composition A is useful for making hot water pipe.

EXAMPLE VII

A PVC composition suitable for coating wire was made using the same composition as given in Example II and using EBPADMA as the cross-linking monomer. The composition was fused in a ¾ inch plastic extruder that was heated to about 350°F. The fused composition was then chopped into small pellets (⅛ inch dia. × ¼ inch long) and re-extruded onto wire at about 400°F. The wire was a solid tinned copper strand 0.032 inch diameter. The thickness of the PVC composition on the wire was 0.017 inch. There was no evidence of thermal polymerization (scorching) of the monomer during extrusion. The coated wire was irradiated to 4 MR and then subjected to a number of physical tests. It had excellent abrasion resistance and resistance to deformation when forced against a hot solder iron. Most importantly, after aging 7 days at 158°C in an oven, it retained 65% of its original elongation (see table). This high retention of elongation is evidence of the stabilizing effect of the monomer used.

Physical Properties of Wire Insulation

| | |
|---|---|
| Tensile strength | 4007 psi |
| Elongation | 240% |
| Elongation after aging | 156% |
| Percent retention of elongation after aging | 65% |

EXAMPLE VIII

In certain cases, it is desirable to replace a part of the cross-linking monomer used with a non-aromatic cross-linking monomer. As an example of this procedure, EBPADMA was partially replaced with trimethylol propane trimethacrylate. This composition is less expensive, and has a greater modulus (stiffness) at elevated temperatures. It is used for making pipe and molded goods which are exposed to high temperatures.

The following two compositions were prepared and their moduli at elevated temperatures were determined:

| | Composition A Parts | Composition B Parts |
|---|---|---|
| PVC 9269A | 100 | 100 |
| Ethoxylated bisphenol A dimethacrylate | 60 | 37.5 |
| Trimethylol propane trimethacrylate | | 22.5 |
| Mark 649C | 3 | 3 |
| Bisphenol A | .5 | .5 |
| K175 | 2 | 2 |
| K120N-D | 1 | 1 |
| Wax 160 | .5 | .5 |
| Ca Stearate | .5 | .5 |
| AC PE629A | .15 | .15 |
| TiO$_2$ | 1 | 1 |
| Carbon black | .05 | .05 |

Composition B is identical to Composition A except that 22.5 parts of the EBPADMA have been replaced with trimethylol propane trimethacrylate.

The two compositions were mixed and molded as described before and then irradiated to 10 Mrads. The shear modulus was then determined as a function of temperature. At 100°C, the shear modulus of Composition A was only 2,500 psi whereas Composition B had a shear modulus of 15,000. It is evident that including a small amount of trimethylol propane trimethacrylate improves the high temperature properties. The composition containing the blend of monomers still had good color stability like the composition containing only EBPADMA as the cross-linking monomer.

GLOSSARY OF NEW TERMS USED

Firestone FPC 9269A is high molecular weight suspension polymerized PVC with a relative viscosity of 2.5.

Santicizer 712 is a plasticizer prepared from trimellitic acid esterified with a mixture of C$_7$, C$_9$ and C$_{11}$ alcohols. It is available from the Monsanto Co.

XPL-125 is a lead barium silicate sulfate complex. It is available from NL Industries.

DS-207 is dibasic lead stearate. It is available from NL Industries.

Wax OP and Wax S are modified aliphatic waxes. They are available from Hoescht Chemical Company.

Irganox 1010 is a high molecular weight phenolic antioxidant. It is available from Ciba-Geigy Co.

Mark 649C is a thiol ester tin stabilizer. It is available from Argus Chemical Company.

Wax 160 is a parafinic wax. It is available from Witco Chemical Co.

Emery 4284R is a high molecular weight polyester plasticizer. It is available from Emery Industries, Inc.

AC PE629A is a low molecular weight oxidized polyethylene that acts as a lubricant during PVC mixing. It is available from Allied Chemical Co.

K175 and K120N-D are acrylic processing aids that improve the melt strength and surface gloss of PVC compounds. They are available from Rohm and Haas.

What is claimed is:

1. Polyvinyl chloride compositions curable by high energy ionizing radiation comprising polyvinyl chloride having an average molecular weight of from about 50,000 to 150,000, together with from about 2% to 50% of at least one curing agent having the general formula:

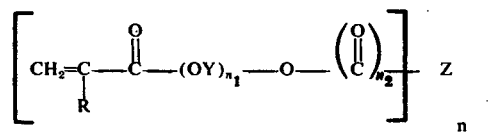

wherein:
R is hydrogen or methyl
$n$ is 1 to 4
$n_1$ is 0 or 1
$n_2$ is 0 or 1
Y is a bifunctional, aliphatic organic radical which may be linear or branched and may be substituted with an acrylic or methacrylic radical or with a radiation stable group, and
Z is an alicyclic group, an aryl group, or an aralkyl group which contains up to two carbon atoms in an exocyclic chain, said groups containing up to two alicyclic rings which may be fused, joined directly through a carbon atom on each ring or bridged together through a carbon or oxygen atom; with the proviso that $n_1$ and $n_2$ are not both zero in the same compound; if $n_2$ is one, $n_1$ is one; and if $n$ is one Y must contain an acrylic or methacrylic function.

2. A composition as in claim 1 suitable for curing to form an insulating coating for electrically conductive wire wherein the weight of curing agent is from about 5% to 15%.

3. A composition as in claim 1 suitable for curing to form pipes wherein the weight of curing agent is from about 25 to 30%.

4. A composition as in claim 1 wherein the curing agent is represented by the formula:

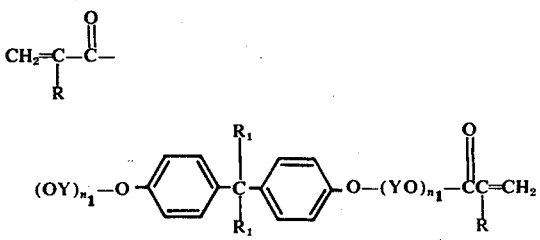

wherein:
Y is ethylene or trimethylene
$n_1$ is 1
$R_1$ is H or —$CH_3$
R is H or —$CH_3$ 5. A composition as in claim 1 wherein the curing agent is represented by the formula:

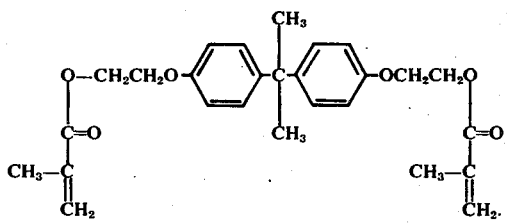

6. A composition as in claim 1 wherein the curing agent is represented by the formula:

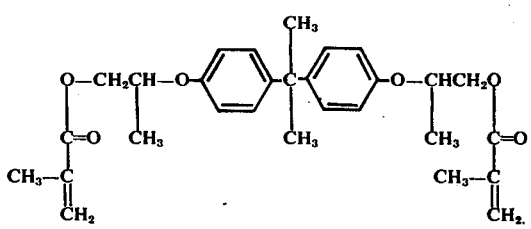

7. A process for the radiation curing of a polyvinyl chloride composition of claim 1 which comprises subjecting said composition to high energy radiation at a total energy dose of from 0.1 to 10 Mrads.

8. A process as in claim 7 wherein the radiation dose is from 1 to 5 Mrads.

9. A radiation cured polyvinyl chloride composition characterized in that polyvinyl chloride having an average molecular weight of from about 50,000 to 150,000 is crosslinked with a curing agent having the general formula:

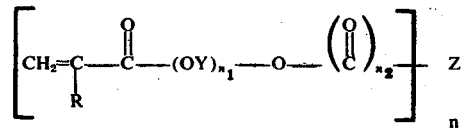

wherein:
R is hydrogen or methyl
$n$ is 1 to 4
$n_1$ is 0 or 1
$n_2$ is 0 or 1
Y is a bifunctional, aliphatic organic radical which may be linear or branched and may be substituted with an acrylic or methacrylic radical or with a radiation stable group, and
Z is an alicyclic group, an aryl group, or an aralkyl group which contains up to two carbon atoms in an exocyclic chain, said groups containing up to two alicyclic rings which may be fused, joined directly through a carbon atom on each ring or bridged together through a carbon or oxygen atom; with the proviso that $n_1$ and $n_2$ are not both zero in the same compound; if $n_2$ is one, $n_1$ is one; and if $n$ is one Y must contain an acrylic or methacrylic function.

10. A composition as in claim 9 wherein the crosslinking agent is represented by the formula:

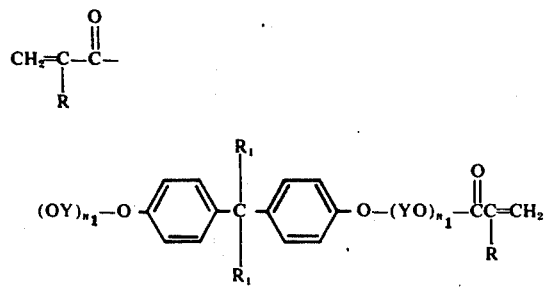
wherein:
Y is ethylene or trimethylene
$n_1$ is 1
$R_1$ is H or -CH$_3$
R is H or -CH$_3$
11. A composition as in claim 9 wherein the curing agent is represented by the formula:
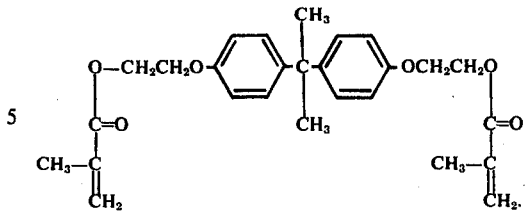
12. A composition as in claim 9 wherein the curing agent is represented by the formula:
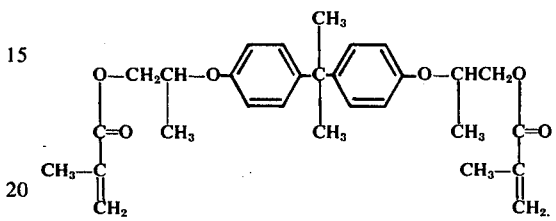
* * * * *